US010085269B2

(12) United States Patent
Wang

(10) Patent No.: US 10,085,269 B2
(45) Date of Patent: Sep. 25, 2018

(54) METHOD AND APPARATUS FOR TERMINAL TO OPTIMIZE NETWORK RESOURCE, AND STORAGE MEDIUM

(71) Applicant: ZTE CORPORATION, Shenzhen, Guangdong Province (CN)

(72) Inventor: Cheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/114,044

(22) PCT Filed: Apr. 21, 2014

(86) PCT No.: PCT/CN2014/075832
§ 371 (c)(1),
(2) Date: Jul. 25, 2016

(87) PCT Pub. No.: WO2015/109669
PCT Pub. Date: Jul. 30, 2015

(65) Prior Publication Data
US 2016/0345333 A1    Nov. 24, 2016

(30) Foreign Application Priority Data

Jan. 26, 2014   (CN) .......................... 2014 1 0038338

(51) Int. Cl.
*H04W 72/04* (2009.01)
*H04W 72/10* (2009.01)
(Continued)

(52) U.S. Cl.
CPC ....... *H04W 72/0493* (2013.01); *H04W 24/02* (2013.01); *H04W 36/00* (2013.01);
(Continued)

(58) Field of Classification Search
None
See application file for complete search history.

(56) References Cited

U.S. PATENT DOCUMENTS

2005/0176465 A1   8/2005 Fornell
2005/0254469 A1*  11/2005 Verma ............... H04W 36/0022
                                              370/338
(Continued)

FOREIGN PATENT DOCUMENTS

CN   102017777 A    4/2011
CN   102821025 A   12/2012
(Continued)

OTHER PUBLICATIONS

The Supplementary European Search Report dated Sep. 12, 2016 in European Application No. EP14879701.2.
(Continued)

*Primary Examiner* — Lonnie V Sweet
(74) *Attorney, Agent, or Firm* — Plumsea Law Group, LLC

(57) ABSTRACT

The present document discloses a method for a terminal optimizing network resources, including: a terminal monitoring whether a network changes in real time according to a network code for identifying the network; when monitoring that the network changes, searching for a Signaling Connection Release Indication (SCRI) policy adapted to the current network in a pre-stored SCRI policy table; the terminal reading a state of each internal module of the terminal; and determining to send SCRI signaling to a network side according to the SCRI policy and the state of each internal module for the network side to release network resources of the terminal according to the SCRI signaling.
(Continued)

Meanwhile, the present document further discloses an apparatus for a terminal optimizing network resources and a storage medium.

12 Claims, 3 Drawing Sheets

(51) Int. Cl.
| | |
|---|---|
| H04W 24/02 | (2009.01) |
| H04W 36/00 | (2009.01) |
| H04W 88/06 | (2009.01) |
| H04W 76/36 | (2018.01) |
| H04W 76/00 | (2018.01) |
| H04W 52/02 | (2009.01) |
| H04W 76/28 | (2018.01) |

(52) U.S. Cl.
CPC ..... *H04W 52/0229* (2013.01); *H04W 72/048* (2013.01); *H04W 72/10* (2013.01); *H04W 76/00* (2013.01); *H04W 76/36* (2018.02); *H04W 88/06* (2013.01); *H04W 72/04* (2013.01); *H04W 76/28* (2018.02); *Y02D 70/00* (2018.01); *Y02D 70/142* (2018.01)

(56) References Cited

U.S. PATENT DOCUMENTS

| | | | |
|---|---|---|---|
| 2007/0297373 A1 | 12/2007 | Saifullah et al. | |
| 2008/0317185 A1 | 12/2008 | Mueller et al. | |
| 2012/0281561 A1 | 11/2012 | Shukla | |
| 2014/0051422 A1* | 2/2014 | Mittal | H04W 12/04 455/419 |
| 2014/0204816 A1* | 7/2014 | Ismail | H04W 52/0258 370/311 |
| 2014/0213246 A1* | 7/2014 | Saito | H04W 8/02 455/432.1 |
| 2014/0342731 A1* | 11/2014 | Carames | H04W 8/02 455/432.1 |
| 2015/0296456 A1* | 10/2015 | Kaikkonen | H04W 52/0216 370/311 |

FOREIGN PATENT DOCUMENTS

| | | |
|---|---|---|
| CN | 103167475 A | 6/2013 |
| EP | 2434830 A1 | 3/2012 |
| WO | 2014000650 A1 | 1/2014 |

OTHER PUBLICATIONS

International Search Report and Written Opinion dated Sep. 19, 2014 in PCT Patent Application No. PCT/CN2014/075832.

* cited by examiner

METHOD AND APPARATUS FOR TERMINAL TO OPTIMIZE NETWORK RESOURCE, AND STORAGE MEDIUM

CROSS-REFERENCE TO RELATED APPLICATION(S)

This application is the U.S. National Phase application of PCT application number PCT/CN2014/075832 having a PCT filing date of Apr. 21, 2014, which claims priority of Chinese patent application 201410038338.6 filed on Jan. 26, 2014, the disclosures of which are hereby incorporated by reference.

TECHNICAL FIELD

The present document relates to an optimization technology of radio resources of a terminal, in particular to a method and an apparatus for a terminal optimizing network resources, and a storage medium.

BACKGROUND OF RELATED ART

According to 3rd Generation Partnership Project (3GPP) wireless network protocols, wireless data terminals in a Wideband Code Division Multiple Access (WCDMA) mode have a space which can be optimized in aspects of radio resource control and power consumption. However, since configuration conditions of operator networks are different, inevitably a set of optimization mechanisms which can self-adapt to networks is needed.

A theoretical basis that the wireless data terminals in the WCDMA mode have the space which can be optimized in aspects of radio resource control and power consumption is briefly described as follow: as defined by 3GPP protocols, radio resource allocation between the wireless data terminals and the networks is managed by a Radio Resource Control (RRC) layer, an RRC connection is needed when data are transmitted between the wireless data terminals and the networks. An RRC connection has three states, and different states correspond to different physical channel allocations, different data transmission bandwidths and different wireless terminal power consumptions. A process of a state transition is led by a network side, the network sets a timer of the state transition, and when a duration exceeds a timing duration, the state transition occurs.

RRC states are described as follows. Physical channel resources allocated by the network to the terminal in each state are different, and current consumption states of the wireless data terminal in each state differ greatly and are approximately as follows:

In DCH state, the connection of the wireless data terminal is realized by using a Dedicated Channel (DCH), High Speed Downlink Shared Channel (HSDSCH) or an Enhanced Dedicated Channel (EDCH), the most radio resources are allocated, the data rate is quicker and the current consumption of the wireless terminal is 150 mA-700 mA.

In FACH state, the connection of the wireless data terminal is realized by using a Random Access Channel (RACH) at an uplink and using a Forward Access Channel (FACH) at a downlink, a small amount of data transmission can be performed and current consumption of the terminal in the state is 100 mA-130 mA.

In Paging Channel (PCH) state, an RRC connection is kept but no data are transmitted, and current consumption of the terminal in the state is 2 mA-3 mA.

In RRC disconnected state-idle state, current consumption of the terminal is 1 mA-2 mA.

When the RRC of the wireless data terminal is the PCH state or idle state, it is a low-power-consumption state, i.e., a sleep state, the radio network resource occupation is the least in the state. Since the existing network timer mode is comparatively fixed and is not flexible enough, there is a situation that a mobile phone is still in the DCH state or the FACH state, and the network resources are occupied and the power is greatly consumed when data exchange is not needed.

Now supposing that the wireless data terminal is in a full-rate data transmission state, a user presses a power button to let the terminal in a standby state, and supposing that a DCH-to-FACH state timer and an FACH-to-PCH state timer are 20 seconds, if full-rate transmission is stopped and the data transmission amount changes to zero when the wireless data terminal is in the standby state, the wireless data terminal will spend 40 seconds to shift from the DCH state to the low-power-consumption PCH state. We estimate ineffective power consumed during the time according to the minimum current consumption value of each state in background knowledge, which is 150 mA*20 sec+100 mA*20 sec=5000 mA*sec and is equivalent to power consumed for 1.5 hours in the low-power-consumption idle state, and this power can satisfy the demand that one terminal is continuously in a standby state for 1.5 hours.

Also as specified in 3GPP protocols, the wireless data terminal may transmit a Signaling Connection Release Indication (SCRI) message to a network side, the network side may release physical channel resources after receiving the message, and the RRC module of the terminal does not maintain the RRC connection any longer but enters a low-power-consumption mode.

To select what time to enable the terminal to initiate SCRI signaling is simply referred to as "SCM policy" in this present document. The requirements of operators in different countries are different according to network deployment thereof. For example, French communication operator Orange requires that the following three conditions need to be simultaneously satisfied: 1) no data traffic lasts 5 seconds; 2) a screen is off; and 3) RRC is in a DCH state. American communication operator ATT requires that the following two conditions need to be simultaneously satisfied: 1) no data traffic; and 2) RRC is in an FACH state. American communication operator TMO (T-Mobile) requires that the following three conditions need to be simultaneously satisfied: 1) no data traffic lasts 5 seconds; 2) a screen is off; and 3) no charging is performed and a terminal is not used as a Universal Serial Bus (USB) HUB or a Wireless Fidelity (WiFi) HUB.

At present, customized terminals, i.e., terminals which are manufactured according to customization of operators, realize the SCRI policy according to requirements of the operators; non-customized terminals realize the SCRI policy of manufacturers or have no SCRI policy, which cannot be changed after leaving the factory.

SUMMARY

The purpose of the embodiments of the present document is to provide a method and an apparatus for a terminal optimizing network resources and a storage medium, such that the problem of how to save radio resources can be better solved and the purpose of reducing terminal power consumption is realized.

According to one aspect, the embodiment of the present document provides a method for a terminal optimizing network resources, comprising:

a terminal monitoring whether a network changes in real time according to a network code for identifying the network;

when monitoring that the network changes, searching for a Signaling Connection Release Indication (SCRI) policy adapted to the current network in a pre-stored SCRI policy table;

the terminal reading a state of each internal module of the terminal; and determining to send SCRI signaling to a network side according to the SCRI policy and the state of each internal module for the network side to release network resources of the terminal according to the SCRI signaling.

Preferably, the terminal monitoring whether said a network changes in real time according to a network code for identifying the network comprises:

the terminal comparing the network code of the current network with a pre-extracted network code; and if the network code of the current network and the pre-extracted network code are different, determining that the network changes, wherein the network code comprises a Mobile Network Code (MNC)/Mobile Country Code (MCC).

Preferably, said when monitoring that the network changes, searching for an SCRI policy adapted to the current network in a pre-stored SCRI policy table comprises:

when monitoring that the network changes, the terminal extracting the MNC/MCC of the current network; and searching for an SCRI policy corresponding to the extracted MNC/MCC in the pre-stored SCRI policy table, and loading the searched SCRI policy.

Preferably, the terminal reading a state of each internal module of the terminal comprises:

the terminal monitoring whether the state of each internal module of the terminal changes in real time;

when the state of the internal module changes, saving a state value of the internal module into an internal module state record table; and the terminal reading the state of each internal module from the internal state record table.

Preferably, the state of each internal module monitored by the terminal in real time is a state of each internal module designated in the SCRI policy.

Preferably, said determining to send SCRI signaling to a network side according to the SCRI policy and the state of each internal module comprises:

when the state of each internal module read by the terminal satisfies the SCRI policy, the terminal sending the SCRI signaling to the network side.

According to another aspect, the embodiment of the present document provides an apparatus for a terminal optimizing network resources, comprising:

a first monitoring module configured to monitor whether a network changes in real time according to a network code for identifying the network, and when monitoring that the network changes, search for a Signaling Connection Release Indication (SCRI) policy adapted to the current network in a pre-stored SCRI policy table; and a determination module configured to read a state of each internal module, and determine to send SCRI signaling to a network side according to the SCRI policy and the state of each internal module for the network side to release network resources of the terminal according to the SCRI signaling.

Preferably, the first monitoring module comprises:

a comparison sub-module configured to compare the network code of the current network with a pre-extracted network code, and if a comparison result is that the network code of the current network and the pre-extracted network code are different, trigger a decision sub-module;

the decision sub-module configured to determine that the network changes, wherein the network code comprises a Mobile Network Code (MNC)/Mobile Country Code (MCC).

Preferably, the first monitoring module further comprises:

an extraction sub-module configured to extract the MNC/MCC of the current network; and a loading sub-module configured to search for an SCRI policy corresponding to the extracted MNC/MCC in the pre-stored SCRI policy table, and load the searched SCRI policy.

Preferably, the apparatus further comprises:

a second monitoring module configured to monitor whether the state of each internal module changes in real time, and when the state of an internal module changes, save a state value of the internal module into an internal module state record table for the determination module to read the state of each internal module from the internal state record table.

According to a third aspect, the embodiment of the present document provides a computer storage medium, in which computer-executable instructions are stored and are used for implementing the method for a terminal optimizing network resources.

In the embodiments of the present document, the terminal monitors whether the network changes in real time according to the network code for identifying the network; when monitoring that the network changes, the terminal searches for the SCM policy adapted to the current network in the pre-stored SCM policy table; the terminal reads the state of each internal module of the terminal; and the terminal determines to send SCM signaling to the network side according to the SCM policy and the state of each internal module for the network side to release the network resources of the terminal according to the SCRI signaling. By adopting the technical solution provided by the embodiment of the present document, the radio resources occupied by the terminal can be reduced and meanwhile the power consumption of the terminal is decreased.

SPECIFIED EMBODIMENTS OF THE INVENTION

The preferred embodiments of the present document will be described below in detail in combination with the drawings. It should be understood that the preferred embodiments described below are just used for describing and explaining the present document instead of limiting the present document.

Figure 1:
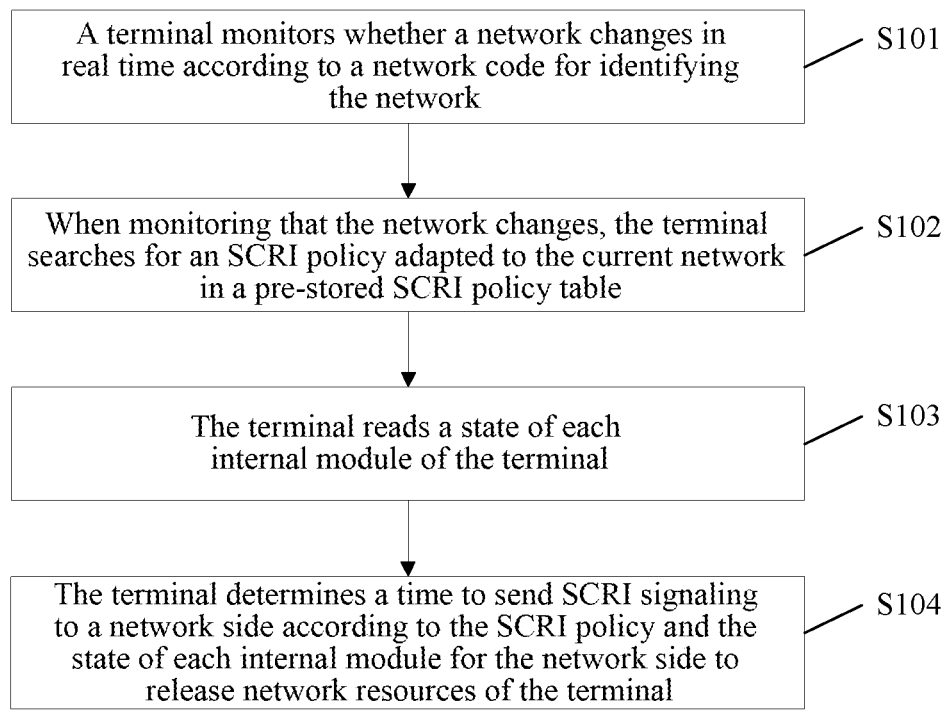
FIG. 1 is a flowchart of a method for a terminal optimizing network resources provided by the embodiment of the present document.

FIG. 1 is a flowchart of a method for a terminal optimizing network resources provided by the embodiment of the present document. As illustrated in FIG. 1, the method comprises:

In step S101, a terminal monitors whether a network changes in real time according to a network code for identifying the network.

Specifically, the terminal compares a network code of the current network with a pre-extracted network code, and if the network code of the current network and the pre-extracted network code are different, the terminal determines that the network changes; wherein the network code comprises a Mobile Network Code (MNC)/Mobile Country Code (MCC).

In step S102, when monitoring that the network changes, the terminal searches for an SCRI policy adapted to the current network in a pre-stored SCRI policy table.

Specifically, when monitoring that the network changes, the terminal extracts the MNC/MCC of the current network, searches for the SCRI policy corresponding to the extracted MNC/MCC in the pre-stored SCRI policy table, and loads the searched SCRI policy.

In step S103, the terminal reads a state of each internal module of the terminal.

Specifically, the terminal monitors whether the state of each internal module of the terminal changes in real time, and when the state of the internal module changes, the terminal saves a state value of the internal module in an internal module state record table; and then the terminal reads the state of each internal module from the internal state record table. More preferably, the state of each internal module monitored by the terminal in real time is the state of each internal module designated in the SCRI policy.

In step S104, the terminal determines to send SCRI signaling to a network side according to the SCRI policy and the state of each internal module for the network side to release network resources of the terminal according to the SCRI signaling.

Specifically, when the state of each internal module read by the terminal satisfies the SCRI policy, the terminal sends the SCRI signaling to the network side.

The above-mentioned SCRI policy is used for indicating the time that the terminal initiates the SCRI signaling to the network side. Further, when the state of each internal module of the terminal satisfies the conditions specified by the SCRI policy, the terminal sends the SCRI signaling to the network side.

Figure 2:
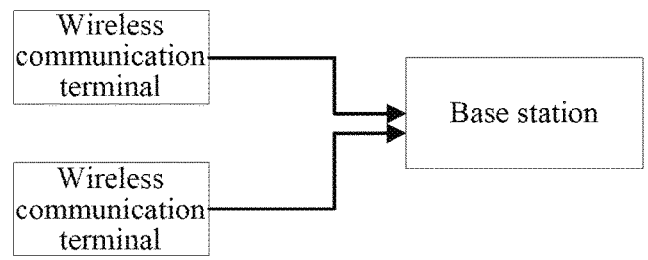
FIG. 2 is a structural schematic diagram of a network reference model provided by the embodiment of the present document.

FIG. 2 is a structural schematic diagram of a network reference model provided by the embodiment of the present document. As illustrated in FIG. 2, the wireless communication terminal in this embodiment may be specifically a data device terminal. For example, when the terminal monitors that the network changes, the terminal searches for the SCM policy adapted to the current network in the pre-stored SCRI policy table according to the MNC/MCC of the current network. The SCM policy specifies that the terminal sends the SCRI signaling to the network side when the terminal simultaneously satisfies the three conditions that no data traffic lasts 5 seconds (which is determined by monitoring a data transmission module on a Packet Data Convergence Protocol (PDCP) layer), a screen is off (which is determined by monitoring the screen) and RRC is in a DCH state (which is determined by monitoring an RRC module).

The terminal may monitor the state of each internal module with the following two manners: 1) the terminal monitors the state of each internal module in real time, when the state of a module changes, the terminal saves the state value of the internal module in the internal module state record table, and the internal module with the state which changes may be the data transmission module on the PDCP layer, the screen or the RRC module, and may also be other internal modules such as a USB module and the like; and 2) the terminal monitors the state of each internal module in real time, when the state of an internal module changes, the terminal determines whether the state (or the internal module) is the state (or the internal module) monitored as designated by the SCRI policy, and if so, the terminal saves the state value of the internal module in the internal module state record table. After the terminal saves the state value of the internal module in the internal module state record table, the terminal reads the state designated by the SCRI policy from the internal module state record table, and when the three conditions are simultaneously satisfied, the terminal sends the SCRI signaling to the network side, otherwise, the terminal continuously monitors the state of each internal module. After the network side receives the SCRI signaling, the network side may release the physical channel resources such that the RRC module of the terminal does not maintain the RRC connection any longer, thus the terminal enters a low-power-consumption mode.

Figure 3:
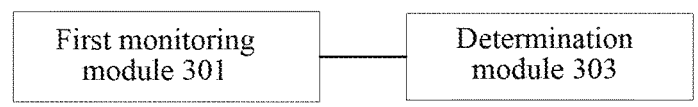
FIG. 3 is a structural schematic diagram of an apparatus for a terminal optimizing network resources provided by the embodiment of the present document.
Figure 4:
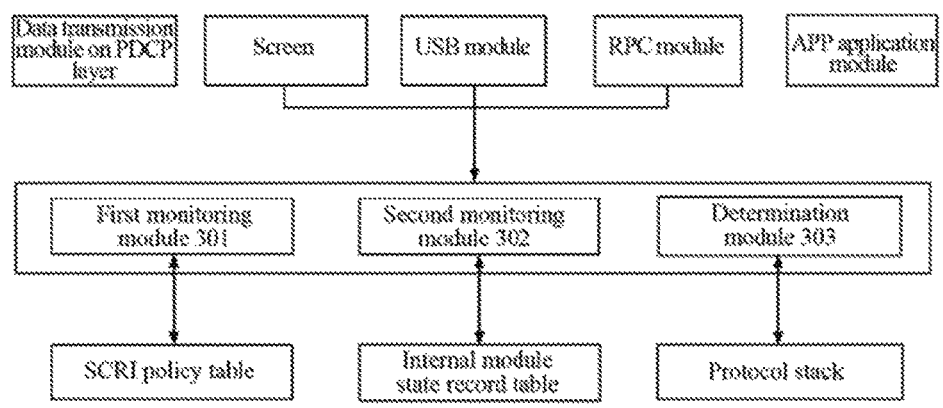
FIG. 4 is a structural schematic diagram of a communication processor system provided by the present document.

FIG. 3 is a structural schematic diagram of an apparatus for a terminal optimizing network resources provided by the embodiment of the present document; and FIG. 4 is a structural schematic diagram of a communication processor system provided by the embodiment of the present document. The apparatus provided by the embodiment of the present document will be described below in combination with FIG. 3 and FIG. 4. Certainly, FIG. 4 is also considered as an application scenario diagram of an apparatus for a terminal optimizing network resources provided by the embodiment of the present document.

As illustrated in FIG. 4, in the Communication Processor (CP) system of the wireless terminal, the apparatus for optimizing network resources provided by the embodiment of the present document is introduced, and the apparatus may be specifically arranged on a modem side of the terminal.

As illustrated in FIG. 3, the apparatus comprises: a first monitoring module 301, a second monitoring module 302 and a determination module 303, wherein, the first monitoring module 301 is configured to monitor whether a network changes in real time according to a network code for identifying the network, and when monitoring that the network changes, search for an SCRI policy adapted to the current network in a pre-stored SCRI policy table, wherein the SCRI policy is used for indicating the time that the terminal initiates SCRI signaling.

The first monitoring module 301 comprises a comparison sub-module, a decision sub-module, an extraction sub-module and a loading sub-module, wherein the comparison sub-module compares the network code of the current network with a pre-extracted network code, and triggers the decision sub-module if the network code of the current network and the pre-extracted network code are different; the decision sub-module determines that the network changes, wherein the network code comprises an MNC/MCC. At this moment, the extraction sub-module extracts the MNC/MCC of the current network for the loading sub-module to search for the SCRI policy corresponding to the extracted MNC/MCC in the pre-stored SCRI policy table, and loads the searched SCRI policy.

In other words, the first monitoring module 301 monitors whether the network changes in real time, and when the network changes, the MNC/MCC is extracted from air interface signaling, and the SCRI policy suitable for the current network is searched for in the SCRI policy table related to MNC/MCC and SCRI policies of each operator and then is loaded.

The second monitoring module 302 is configured to monitor whether the state of each internal module of the terminal changes in real time, and when the state of an internal module changes, save a state value of the internal module in an internal module state record table for the determination module to read the state of each internal module from the internal state record table.

In other words, the states of the current terminal device monitored by the second monitoring module 302 comprise:
  a) RRC state;
  b) data receiving and transmitting state on the PDCP layer, whether a timer that no data traffic lasts t seconds has reached, wherein the timer is configurable;
  c) whether the terminal is in a charging state;
  d) terminal screen state; and
  e) whether the terminal is using a USB tethering or portable WiFi hotspot function.

The second monitoring module 302 always records the state of each internal module, e.g., the state of the RRC module, the state of the data transmission module on the PDCP layer, the state of the screen, the state of the USB module, the state of an APP application module, etc. When the state of an internal module changes, the record value (i.e., the state value) of the internal module is updated into the internal module record table.

The determination module 303 is configured to read a state of each internal module, and determine to send SCRI signaling to a network side according to the SCRI policy and the state of each internal module for the network side to release network resources of the terminal according to the SCRI signaling.

The determination module 303 performs a calculation in a passive excitation manner. Specifically, when the state of an internal module changes, the second monitoring module 302 updates the state value of the internal module and triggers the determination module 303 to perform a calculation, read the current SCRI policy, read the state value of each internal module. When all state values satisfy the SCRI policy, the determination module 303 initiates the SCRI signaling to the network side through a protocol stack.

For example, when the terminal monitors that the network changes, the terminal searches for the SCRI policy adopted to the current network in the pre-stored SCRI policy table by using the MNC/MCC of the current network, and the SCRI policy specifies that the terminal sends the SCRI signaling to the network side when the terminal simultaneously satisfies the three conditions that no data traffic (which is determined by monitoring the data transmission module on the PDCP layer), RRC is in the FACH state (which is determined by monitoring the RRC module) and the WiFi hotspot function is not used (which is determined by monitoring the APP application module). The terminal may monitor the state of each internal module with the following two manners:

In manner 1, the terminal monitors the state of each internal module in real time, when the state of a module changes, the terminal saves the state value of the internal module in the internal module state record table. The internal module with the state which changes may be the data transmission module on the PDCP layer, the RRC module or the APP application module, and may also be other internal modules such as the USB module and the like, and when the state of any module changes, the current state of the module may be recorded in the internal module state record table.

In manner 2, the terminal monitors the state of each internal module in real time, when the state of a module changes, the terminal determines whether the state (or the internal module) is the state (or the internal module) monitored as designated by the SCRI policy, and if so, the terminal saves the state value of the internal module in the internal module state record table. For example, if monitoring that the RRC is in the FACH state, the terminal determines that the RRC state is the state which needs to be monitored and the current state of the RRC module is recorded; and for another example, if monitoring that the screen is off, the terminal determines that the state is not the state which needs to be monitored and the current state of the screen is not recorded. After the terminal saves the state value of the internal module in the internal module state record table, the terminal reads the state designated by the SCRI policy from the internal module state record table, i.e., the current states of the data transmission module on the PDCP layer, the RRC module and the APP application module. The terminal sends the SCRI signaling to the network side when the three conditions that no data traffic, the RRC is in the FACH state and the WiFi hotspot function is not used are simultaneously satisfied. After the network side receives the SCRI signaling, the network side may release the physical channel resources such that the RRC module of the terminal does not maintain the RRC connection any longer, thus the terminal enters a low-power-consumption mode.

During an actual application, the first monitoring module 301, the second monitoring module 302 and the determination module 303 may be implemented by a Central Processing Unit (CPU), or a Digital Signal Processor (DSP), a Micro Processor Unit (MPU) or a Field Programmable Gate Array (FPGA) or the like; and the CPU, the DSP and the FPGA may be built in the wireless communication terminal.

Figure 5:
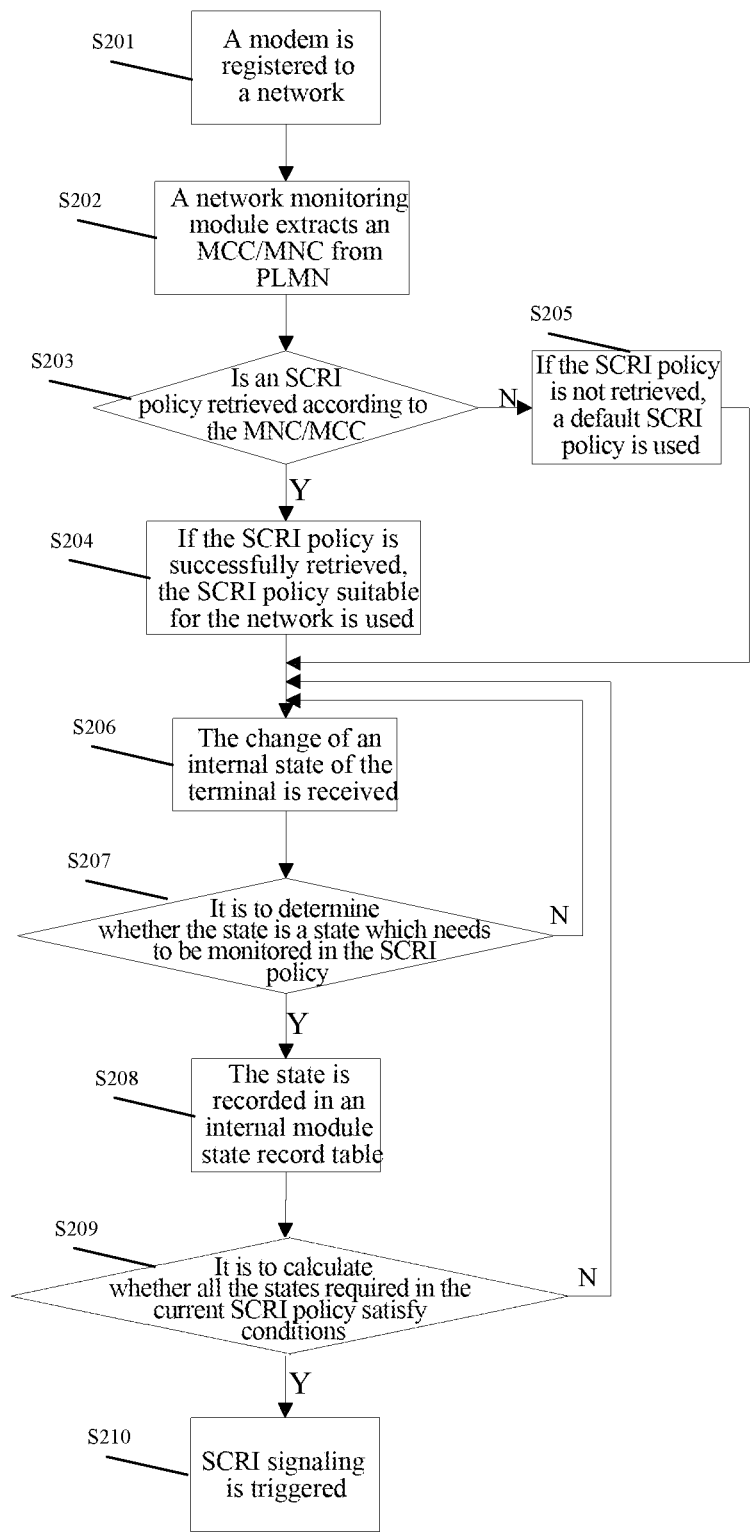
FIG. 5 is a flowchart for a terminal optimizing network resources provided by the embodiment of the present document.

FIG. 5 is a flowchart for adaptively optimizing radio resources of a terminal at a local network provided by the embodiment of the present document. As illustrated in FIG. 5, the steps comprise:

In step S201, a modem is registered to a network.

In step S202, a Public Land Mobile Network (PLMN) code of a current network is acquired and an MNC/MCC is extracted from the PLMN code.

In step S203, an SCRI policy is retrieved according to the MNC/MCC, and if the SCRI can be retrieved, step S204 is executed, and otherwise, step S205 is executed.

In step S204, if the SCRI policy is successfully retrieved, the SCRI policy suitable for the network is used and step S206 is continuously executed.

In step S205, if the SCRI policy is not retrieved, a default SCRI policy is used and step S206 is continuously executed.

In step S206, whether the state of each internal module changes is monitored.

In step S207, if any state changes, it is to determine whether the state is a state which needs to be monitored in the SCRI policy, if so, step S208 is executed, and if not, it is to return to step S206.

In step S208, the state is recorded in an internal module state record table.

In step S209, it is to calculate whether all the states required in the current SCRI policy satisfy conditions, if so, step S210 is executed, and if not, it is to return to step S206.

In step S210, a terminal sends SCRI signaling to a network side.

The embodiment of the present document further provides a computer storage medium, wherein computer-executable instructions are stored in the computer storage medium and the computer-executable instructions are used for implementing the method for the terminal optimizing network resources.

To sum up, the embodiments of the present document have the following technical effects: radio resources occupied by the terminal can be reduced and the power consumption of the terminal can be decreased. Moreover, one skilled in the art should understand that, on the basis of the embodiments of the present document, the optimization of radio resources and the power consumption of the wireless data terminal may be further implemented by changing and adjusting the SCM policy.

One skilled in the art should understand that the embodiments of the present document may be provided as methods, systems or computer program products. Therefore, the present document may adopt the form of hardware embodiments, software embodiments or embodiments of hardware and software combinations. In addition, the present document may adopt the form of computer program products which are implemented on one or more computer-available storage mediums (including but not limited to magnetic disk memories, optical memories and the like) which include computer-available program codes.

The present document is described by referring to flowcharts and/or block diagrams of the method, the apparatus (system) and the computer program product according to the embodiments of the present document. It should be understood that each process and/or block in the flowcharts and/or block diagrams and combinations of processes and/or blocks in the flowcharts and/or block diagrams may be implemented through computer program instructions. These computer program instructions may be provided to processors of general-purpose computers, special-purpose computers, embedded computers or other programmable data processing devices to produce a machine, such that instructions executed through processors of computers or other programmable data processing devices produce apparatuses for implementing functions designated in one process or more processes in the flowcharts and/or one block or more blocks in the block diagrams.

These computer program instructions may also be stored in computer-readable memories which can guide computers or other programmable data processing devices to work in a specific manner, such that the instructions stored in the computer-readable memories produce products comprising instruction devices, and the instruction devices realize functions designated in one process or more processes in the flowcharts and/or one block or more blocks in the block diagrams.

These computer program instructions may also be loaded to computers or other programmable data processing devices, such that a series of operation steps are executed on the computers or other programmable devices to perform processing realized by the computers, so as to the instructions which are executed on the computers or other programmable devices provide steps for realizing functions designated in one process or more processes in the flowcharts and/or one block or more blocks in the block diagrams.

Although the present document has already been described above in detail, the present document is not limited thereto. One skilled in the art may make various modifications according to the principle of the present document. Therefore, all modifications made according to the principle of the present document shall be understood as covered by the protection scope of the present document.

What is claimed is:

1. A method for a terminal optimizing network resources, comprising:

a terminal monitoring whether a network changes in real time according to a network code for identifying the network; wherein the network code comprises a Mobile Network Code (MNC)/Mobile Country Code (MCC);

when monitoring that the network changes, according to the network code, searching for a Signaling Connection Release Indication (SCRI) policy adapted to the current network in a pre-stored SCRI policy table;

the terminal reading a state of each internal module of the terminal; and determining to send SCRI signaling to a network side according to the SCRI policy and the state of each internal module for the network side to release network resources of the terminal according to the SCRI signaling;

wherein said when monitoring that the network changes, according to the network code, searching for an SCRI policy adapted to the current network in a pre-stored SCRI policy table comprises:

when monitoring that the network changes, the terminal extracting the MNC/MCC of the current network; and searching for an SCRI policy corresponding to the extracted MNC/MCC in the pre-stored SCRI policy table, and loading the searched SCRI policy.

2. The method according to claim 1, wherein said a terminal monitoring whether a network changes in real time according to a network code for identifying the network comprises:

the terminal comparing the network code of the current network with a pre-extracted network code; and if the network code of the current network and the pre-extracted network code are different, determining that the network changes.

3. The method according to claim 2, wherein said determining to send SCRI signaling to a network side according to the SCRI policy and the state of each internal module comprises:

when the state of each internal module read by the terminal satisfies the SCRI policy, the terminal sending the SCRI signaling to the network side.

4. The method according to claim 1, wherein the terminal reading a state of each internal module of the terminal comprises:

the terminal monitoring whether the state of each internal module of the terminal changes in real time;

when the state of the internal module changes, saving a state value of the internal module into an internal module state record table; and the terminal reading the state of each internal module from the internal state record table.

5. The method according to claim 4, wherein the state of each internal module monitored by the terminal in real time is a state of each internal module designated in the SCRI policy.

6. The method according to claim 5, wherein said determining to send SCRI signaling to a network side according to the SCRI policy and the state of each internal module comprises:

when the state of each internal module read by the terminal satisfies the SCRI policy, the terminal sending the SCRI signaling to the network side.

7. The method according to claim 4, wherein said determining to send SCRI signaling to a network side according to the SCRI policy and the state of each internal module comprises:
when the state of each internal module read by the terminal satisfies the SCRI policy, the terminal sending the SCRI signaling to the network side.

8. The method according to claim 1, wherein said determining to send SCRI signaling to a network side according to the SCRI policy and the state of each internal module comprises:
when the state of each internal module read by the terminal satisfies the SCRI policy, the terminal sending the SCRI signaling to the network side.

9. A non-transitory computer-readable storage medium, in which computer-executable instructions are stored and are used for implementing the method for a terminal optimizing network resources according to claim 1.

10. An apparatus for a terminal optimizing network resources, comprising:
a non-transitory computer readable storage medium;
a processor coupled to the non-transitory computer readable storage medium, executing:
a first monitoring module to monitor whether a network changes in real time according to a network code for identifying the network where the network code comprises a Mobile Network Code (MNC)/Mobile Country Code (MCC), and when monitoring that the network changes, according to the network code, search for a Signaling Connection Release Indication (SCRI) policy adapted to the current network in a pre-stored SCRI policy table; and
a determination module to read a state of each internal module, and determine to send SCRI signaling to a network side according to the SCRI policy and the state of each internal module for the network side to release network resources of the terminal according to the SCRI signaling;
wherein the first monitoring module further comprises:
an extraction sub-module configured to extract the MNC/MCC of the current network; and
a loading sub-module configured to search for an SCRI policy corresponding to the extracted MNC/MCC in the pre-stored SCRI policy table, and load the searched SCRI policy.

11. The apparatus according to claim 10, wherein the first monitoring module comprises:
a comparison sub-module configured to compare the network code of the current network with a pre-extracted network code, and if a comparison result is that the network code of the current network and the pre-extracted network code are different, trigger a decision sub-module;
the decision sub-module configured to determine that the network changes.

12. The apparatus according to claim 10, wherein the processor coupled to the non-transitory computer readable storage medium further executes:
a second monitoring module configured to monitor whether the state of each internal module changes in real time, and when the state of an internal module changes, save a state value of the internal module into an internal module state record table for the determination module to read the state of each internal module from the internal state record table.

* * * * *